C. W. PARKER.
TRANSMISSION GEARING.
APPLICATION FILED APR. 29, 1908.
941,034.
Patented Nov. 23, 1909.
2 SHEETS—SHEET 2.
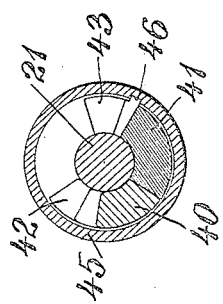
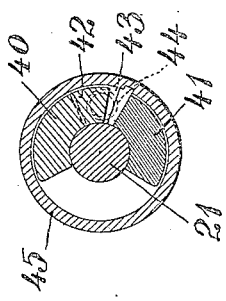
WITNESSES:
Lyman S Andrews Jr
Rudolph Giesig.
INVENTOR
Clark W. Parker
BY
Chapin & Chapin
his ATTORNEYS

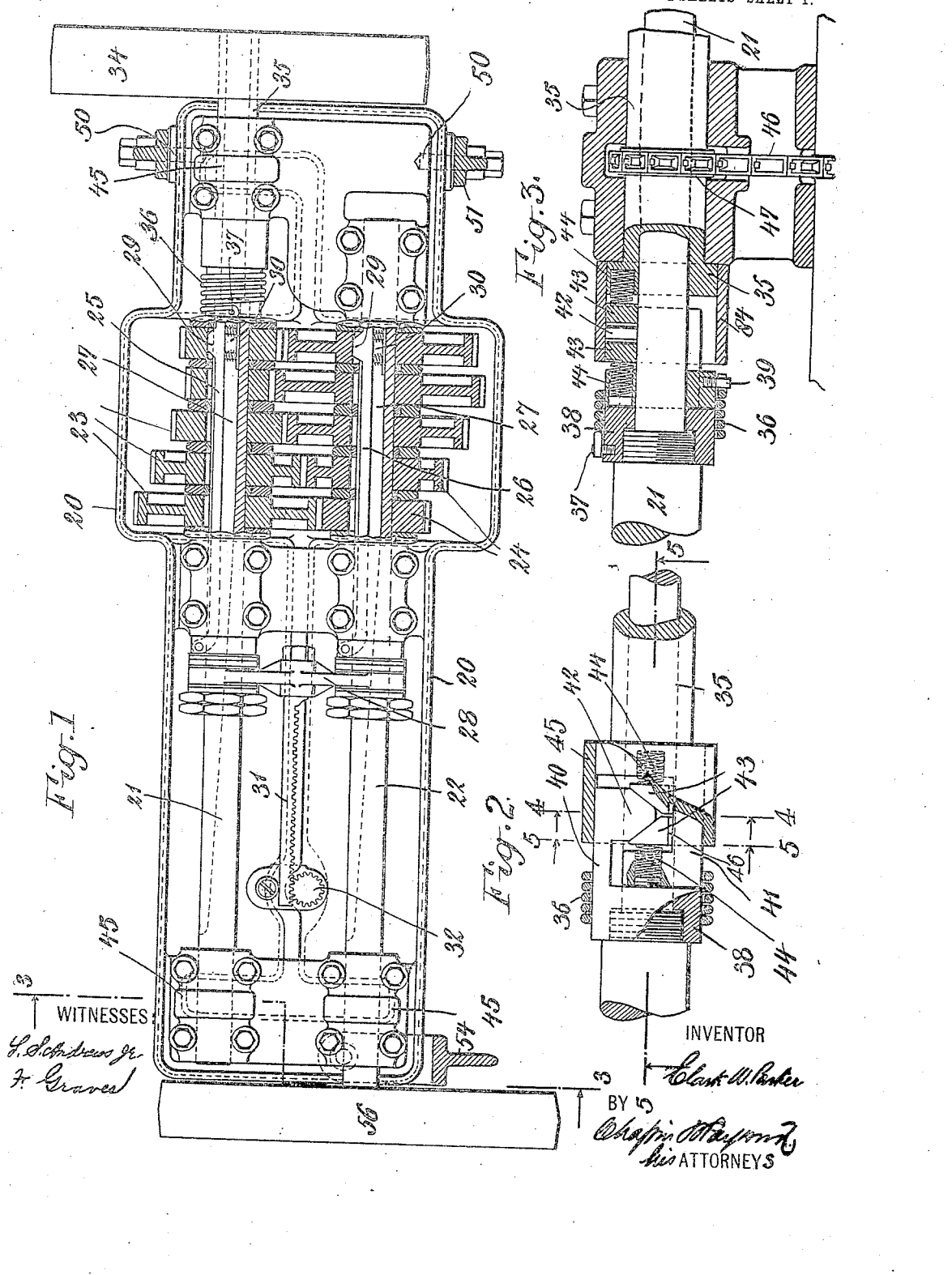

UNITED STATES PATENT OFFICE.

CLARK W. PARKER, OF SPRINGFIELD, MASSACHUSETTS, ASSIGNOR TO LAMB KNITTING MACHINE CO., OF CHICOPEE FALLS, MASSACHUSETTS, A CORPORATION OF MASSACHUSETTS.

TRANSMISSION-GEARING.

941,034.  Specification of Letters Patent.  Patented Nov. 23, 1909.

Application filed April 29, 1908. Serial No. 429,804.

*To all whom it may concern:*

Be it known that I, CLARK W. PARKER, a citizen of the United States of America, and a resident of Springfield, county of Hampden, State of Massachusetts, have invented certain new and useful Improvements in Transmission-Gearing, of which the following is a specification, reference being had to the accompanying drawings, forming a part thereof.

My invention relates to improvements in transmission gearing and particularly to an improved form of shock absorbing means for employment between driving and driven elements therein.

In transmission gearing of the type illustrated in U. S. Patents No. 876083 and No. 876084, which were issued to me on the 7th day of January, 1908, sliding keys are employed for connecting the driving mechanism with parts to be driven, at various rates of speed and in different directions, changes in speed and direction being brought about by shifting the sliding keys from engagement with one set of gearing to another, and in such form of transmission gearing, it will be readily seen that unless means be provided for absorbing shock upon the parts, the parts will quickly become damaged, disarranged or worn due to the sudden changes in speed or direction of relative movements, and to this end, I have devised a peculiar form of shock absorbing device which is particularly adapted for relieving the parts during the time such changes are being made.

In order that my invention may be fully understood I will now proceed to describe an embodiment thereof, having reference to the accompanying drawings illustrating the same and will then point out the novel features in claims.

In the drawings: Figure 1 is a view in longitudinal section through change speed transmission gearing of the sliding key type in which my improved coupling means is employed. Figs. 2 and 3 are detail longitudinal views partially in section of the shock absorber, Fig. 3 being a view taken at right angles to the point of view of Fig. 2. Figs. 4 and 5 are detail transverse sectional views upon the lines 4—4, 5—5 of Fig. 2, the parts in Fig. 5 being, however, shown in different relative positions from those in which the parts are shown in the other views.

The transmission gearing as a whole is contained entirely within a closed casing 20, and comprises in general a drive shaft 21, a driven shaft 22, a plurality of gear wheels 23 mounted loosely upon the drive shaft 21, a plurality of complementary gear wheels 24 loosely mounted upon the shaft 22, a pair of sliding keys 25—26 mounted to slide longitudinally in slots or key-ways 27 in the said shafts 21 and 22 and a carrier 28 to which the said keys are pivotally connected. Each of the keys is provided with a tooth or projection 29 at its outer end and with spring pressed means 30 tending to move the said outer end of the key outwardly in a radial direction. Each of the gear wheels is provided with a slot or key-way arranged to receive the tooth or projection 29 of one of the keys whenever the said key is so positioned as to bring the tooth or projection thereof in register with said gear wheel.

The keys are moved longitudinally for this purpose by movements of the carrier 28, the said carrier being provided with a rack 31, the teeth of which are disposed in mesh with a pinion 32 to which movements of rotation may be imparted by any suitable means.

Driving movements are imparted to the drive shaft 21 from a drive pulley 34, mounted upon a sleeve 35 which surrounds the said shaft at one end thereof. The construction of this sleeve will be more apparent by inspection of Figs. 2 and 3 of the drawings. The sleeve is loosely mounted upon the said shaft but is connected in yielding driving relation therewith by means of a spring 36 which is secured at one end by means of a pin 37 to a collar 38 mounted fast upon the shaft 21 and at the other end to a pin 39 in the sleeve 35. The collar 38 is provided upon one side of the shaft with a portion 40 arranged to project longitudinally thereof, and the sleeve 35 is provided with a complementary portion 41 arranged longitudinally upon the other side of the shaft side by side with the said projecting portion 40. The relative positions and the respective areas of these projecting portions will be better understood by reference to Figs. 4 and 5 of the drawings.

The spring 36 is arranged to have such a tension as to normally hold the parts in the position in which they are shown in Fig. 5 of the drawings, that is to say, with the rear faces of the projecting portions 40—41 in abutting relation with each other, and the spring is designed to be of such strength as to preferably just maintain the parts in this position when the parts are running free. Directly resistance, due to work being done, is thrown upon the driving shaft 21, the spring will be wound up further so that the opposite faces of the parts 40—41 will approach each other as is shown in Figs. 4 and 5 of the drawings. As the parts reach the limit of their movement, a tooth 42 upon the projection 40 of the collar 38 will engage blocks 43 mounted in the sleeve 35. The blocks 43 are mounted to slide longitudinally in the said sleeve 35, such longitudinal movement being opposed by springs 44.

The co-acting faces of the tooth 42 and the blocks 43 are at an angle as is shown in Fig. 2 of the drawings so that there is a cam or wedge-like action between the parts, tending to drive the blocks 43 longitudinally in opposite directions as the collar 38 moves farther forward with respect to the sleeve 35 under an increased resistance against the tension of the spring 36. Thus, after a certain amount of resistance has been taken up in the spring 36, further resistance will be absorbed in the movement of the blocks 43 but the blocks in yielding save the shock that would otherwise occur if the projection 40 were allowed to have a direct engagement with the projection 41.

In a co-pending application, Ser. No. 414,485, filed Feb. 6th, 1908, I have shown a shock absorber comprising two co-engaging collars with a spring similar to the spring 36 between them; but in that case, the spring 36 was designed to be very much stronger than the spring in my present invention, and the two collars were arranged to directly engage when the limit of their relative movements was reached. I find in actual practice, however, that the tendency of such a drive is to cause a fluctuation of the work, that is to say, there is not sufficient steadiness to the drive, and in lathe work, for instance, the tendency of the work was to jump forward whenever the resistance lessened, as toward the end of a cut. In the present instance, however, by reason of the fact that the tooth 42 and blocks 43 are designed to be always in engagement whenever any work is being done, the drive is much steadier, yet if the resistance is suddenly increased, the movement permitted to the block will immediately absorb any sudden shock.

A collar 45 is arranged to surround a portion of the sleeve 35 and the projection 41 therefrom, whereby to form a complete housing for the blocks 43. The blocks 43 may be conveniently splined to the said sleeve as is shown at 46.

What I claim is:

1. In transmission gearing of the class described, the combination with two relatively rotatable elements having abutments arranged for co-engagement to limit the extent of said relative rotative movements, of a spring connecting the two said parts together in driving relation and under tension to hold the rear faces of the said abutments together, and shock absorbing means arranged to operate, as the opposite faces of the said abutments come together following relative rotative movements of the members against the resistance of the said spring.

2. In transmission gearing of the class described, the combination with two relatively rotatable driving elements provided with abutments adapted to co-engage and to limit the relative rotative movement of the said elements, one of the said elements being provided with a yielding spring pressed face, of a spring for connecting the two said elements together in driving relation, the spring being under tension to oppose the engagement of the one said abutment with the yielding face of the other.

3. In transmission gearing of the character described, the combination with two relatively rotatable driving elements having abutments which are adapted to co-engage and thereby to limit the extent of the said rotative movements, one of the said abutments having an angular face and the other of the said abutments provided with a longitudinally movable spring pressed block adapted to be engaged by the said angular face, of a spring for connecting the two said elements together in driving relation, the said spring opposing the engagement of the said abutment with the said block.

4. In transmission gearing of the class described, the combination with two relatively rotatable driving elements, one of the said elements provided with a tooth having oppositely inclined faces and longitudinally movable spring pressed blocks carried by the other said element, adapted to be engaged by the said inclined faces, of a spring for connecting the two said elements together in driving relation, the tension of the said spring opposing the engaging of the said abutment with the spring pressed blocks.

5. In transmission gearing of the class described, the combination with a driving shaft, of a sleeve mounted thereon, an abutment carried by the said shaft, the said abutment having an angular face, and the said sleeve provided with an abutment having a face for co-engagement with the said sleeve, a spring for pressing the said face of the abutment longitudinally in a direction toward the face of the abutment upon the shaft, and a spring for connecting the said sleeve and shaft in driving relation.

6. In transmission gearing of the class described, the combination of a shaft provided with a wedge-shaped abutment located eccentrically of the axis thereof, a sleeve mounted upon the said shaft, a pair of spring pressed longitudinally movable blocks carried by the said sleeve and arranged for engagement with the opposite faces of the said wedge-shaped abutment, and a spring connecting the said sleeve and shaft together in driving relation.

7. In transmission gearing of the class described, the combination with a driving shaft, a wedge-shaped abutment carried thereby eccentric of the center thereof, a sleeve mounted rotatively on the said shaft, longitudinal movable blocks carried by the said sleeve, said blocks arranged for co-engagement with the opposite faces of the wedge-shaped abutment, springs tending to press the said blocks longitudinally together, a housing sleeve surrounding the said longitudinally movable blocks and the wedge-shaped projection, and parts carrying the said blocks and projection, and a spring connecting the said sleeve and shaft together in driving relation.

8. In transmission gearing of the class described, the combination with two relatively rotatable elements having abutments adapted for co-engagement to limit the extent of said relative rotative movements in either direction, of a helical spring connected at its opposite ends to the two said members, said spring being under normal tension to cause the co-engagement of the said abutments in one direction.

9. In transmission gearing of the class described, the combination with two relatively rotatable elements having abutments adapted for co-engagement to limit the extent of said relative rotative movements in either direction, of a helical spring connected at its opposite ends to the two said members, the axis thereof being coincident with the axis of rotation of the said element, said spring being under normal tension to cause the co-engagement of the said abutment in one direction.

10. In transmission gearing of the class described, the combination with a shaft, a helical spring surrounding the same and having one end connected thereto, a sleeve rotatably mounted upon the said shaft, the other end of the said helical spring being connected to the said sleeve, the said shaft and sleeve being provided with abutments arranged for co-engagement to limit the extent of the relative rotative movements of the shaft and sleeve in either direction, the said spring being normally under tension to maintain co-engagement of the said abutments in one direction.

CLARK W. PARKER.

Witnesses:
 E. C. FINK,
 L. C. FAY.